(12) United States Patent
Ho et al.

(10) Patent No.: US 7,334,516 B2
(45) Date of Patent: Feb. 26, 2008

(54) AGING DEVICE FOR LIQUOR OR WINE

(75) Inventors: Tzu Lung Ho, Taipei (TW); Yung Ho Chiu, Taipei (TW)

(73) Assignee: Taiwan Supercritical Technology Co., Ltd., Jhonghen District, Taipei (TW)

( * ) Notice: Subject to any disclaimer, the term of this patent is extended or adjusted under 35 U.S.C. 154(b) by 0 days.

(21) Appl. No.: 11/370,440

(22) Filed: Mar. 8, 2006

(65) Prior Publication Data
US 2007/0209520 A1  Sep. 13, 2007

(51) Int. Cl.
*A23L 1/00* (2006.01)
(52) U.S. Cl. .................. 99/277.2; 99/348; 366/144; 366/149
(58) Field of Classification Search .......... 99/275–279, 99/452–455, 348, 516, 517; 366/144–149, 366/108–128
See application file for complete search history.

(56) References Cited

U.S. PATENT DOCUMENTS

| | | | |
|---|---|---|---|
| 2,815,193 A | * | 12/1957 | Brown ................. 366/113 |
| 5,044,428 A | * | 9/1991 | Nohl ..................... 165/85 |
| 5,052,812 A | * | 10/1991 | Tannenbaum et al. ...... 366/209 |
| 5,173,318 A | | 12/1992 | Leu et al. ............... 426/238 |
| 5,233,916 A | * | 8/1993 | Butler et al. ............. 99/325 |
| 5,399,013 A | * | 3/1995 | Sawyer .................. 366/211 |
| 5,544,683 A | * | 8/1996 | Guhl ..................... 141/65 |
| 5,736,100 A | * | 4/1998 | Miyake et al. ............ 422/64 |
| 6,065,395 A | * | 5/2000 | Sollich .................. 99/470 |

* cited by examiner

*Primary Examiner*—Timothy F. Simone
(74) *Attorney, Agent, or Firm*—Charles E. Baxley

(57) ABSTRACT

An aging device includes an aging container having a chamber formed by a peripheral wall, a bottle received in the chamber of the aging container for receiving a liquid fermented product, and a vibrating device disposed in the aging container for applying a frequency to vibrate the liquid fermented product received in the bottle in order to oxidize the liquid fermented product. A vibrating medium is arranged between the bottle and the peripheral wall of the aging container. A heater may be disposed in the aging container for heating the bottle. The aging container includes an inner peripheral space formed in the peripheral wall for receiving the heater or a heat exchanging medium.

1 Claim, 5 Drawing Sheets

AGING DEVICE FOR LIQUOR OR WINE

BACKGROUND OF THE INVENTION

1. Field of the Invention

The present invention relates to an aging device, and more particularly to an aging device for aging a bottled and fermented product, such as liquor, wine, alcohol or the like.

2. Description of the Prior Art

Typical liquor or wine or alcohol or other fermented products are required to be aged for several years before they may be sold or marketed. For allowing the fermented products to be suitably produced, catalysts or agents or solutions or enzymes or the like are required to be introduced into the fermented products for allowing the aging time of the fermented products to be suitably reduced or decreased. However, the aging time of the fermented products may not be greatly reduced or decreased.

U.S. Pat. No. 5,173,318 to Leu et al. discloses another method or apparatus for aging a distilled liquor and comprising an ultrasonic vibration unit attached to an aging tank for applying a frequency to vibrate and heat the liquid fermented product in order to oxidize the liquid fermented product. The aging apparatus for the distilled liquor includes a huge structure that may only be purchased or obtained by manufacturing plants or companies, but may not be available for individuals.

The liquid fermented product is normally required to be poured or filled into the aging tank before the liquid fermented product may be bottled or packaged for selling purposes. However, after the previous liquid fermented product has been aged, the aging tank is required to be released and cleaned or washed before the other different liquid fermented product may be poured or filled into the aging tank, for preventing the different liquid fermented products from being mixed or blended with each other.

In addition, the apparatus or Leu et al. may not be used for aging the liquid fermented products that have been bottled or packaged, or may only be used for aging the liquid fermented products before being bottled or packaged, such that Leu et al. may not be used for being used in house families.

The present invention has arisen to mitigate and/or obviate the afore-described disadvantages of the conventional aging devices for liquid fermented products.

SUMMARY OF THE INVENTION

The primary objective of the present invention is to provide an aging device for aging the liquid fermented products that have been bottled or packaged.

The other objective of the present invention is to provide an aging device including a heating device for facilitating the aging of the liquid fermented products.

In accordance with one aspect of the invention, there is provided an aging device comprising an aging container including a chamber formed therein and defined by a peripheral wall, a bottle received in the chamber of the aging container for receiving a liquid fermented product, and a vibrating device disposed in the aging container for applying a frequency to vibrate the liquid fermented product received in the bottle in order to oxidize the liquid fermented product.

The vibrating device is preferably disposed in a bottom portion of the aging container. A vibrating medium is received in the chamber of the aging container and arranged between the bottle and the peripheral wall of the aging container. The vibrating medium is preferably water.

A heater is preferably disposed in the aging container for heating the bottle. The aging container includes an inner peripheral space formed in the peripheral wall for receiving the heater. The aging container includes a heat exchanging medium received in the inner peripheral space of the peripheral wall of the aging container for heat exchanging with the heater and the bottle. The heat exchanging medium is preferably water.

The aging container includes an inlet portion and an outlet port communicating with the inner peripheral space of the aging container for circulating the heat exchanging medium. A pump and a condenser are preferably coupled between the inlet portion and the outlet port for circulating the heat exchanging medium. The frequency of the vibrating device is ranged from 20 to 160 kHz, and preferably ranged from 20 to 80 kHz.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
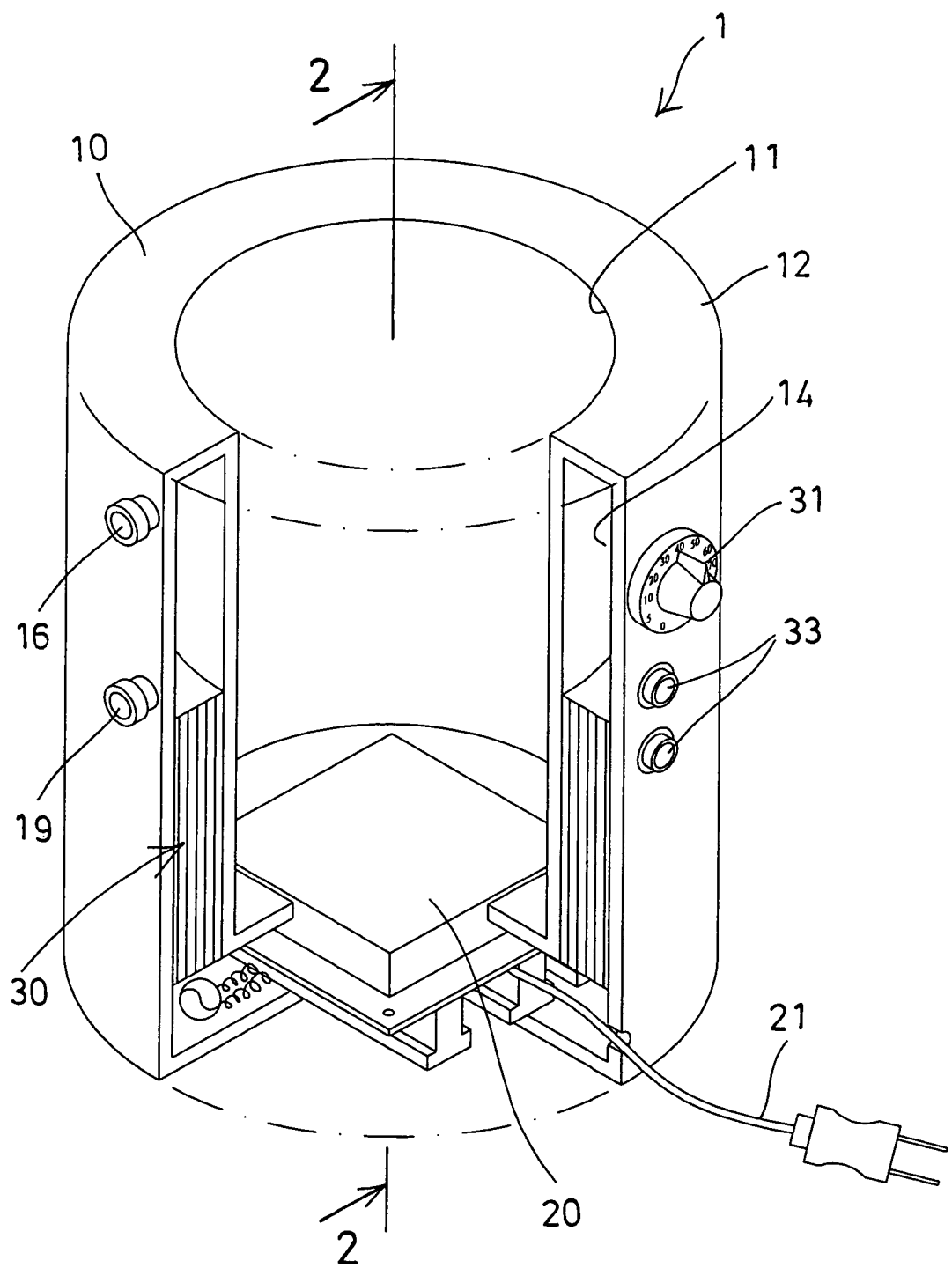
FIG. 1 is a perspective view of an aging device in accordance with the present invention, in which a portion of the aging device has been cut off for showing an inner structure or configuration of the aging device.
Figure 2:
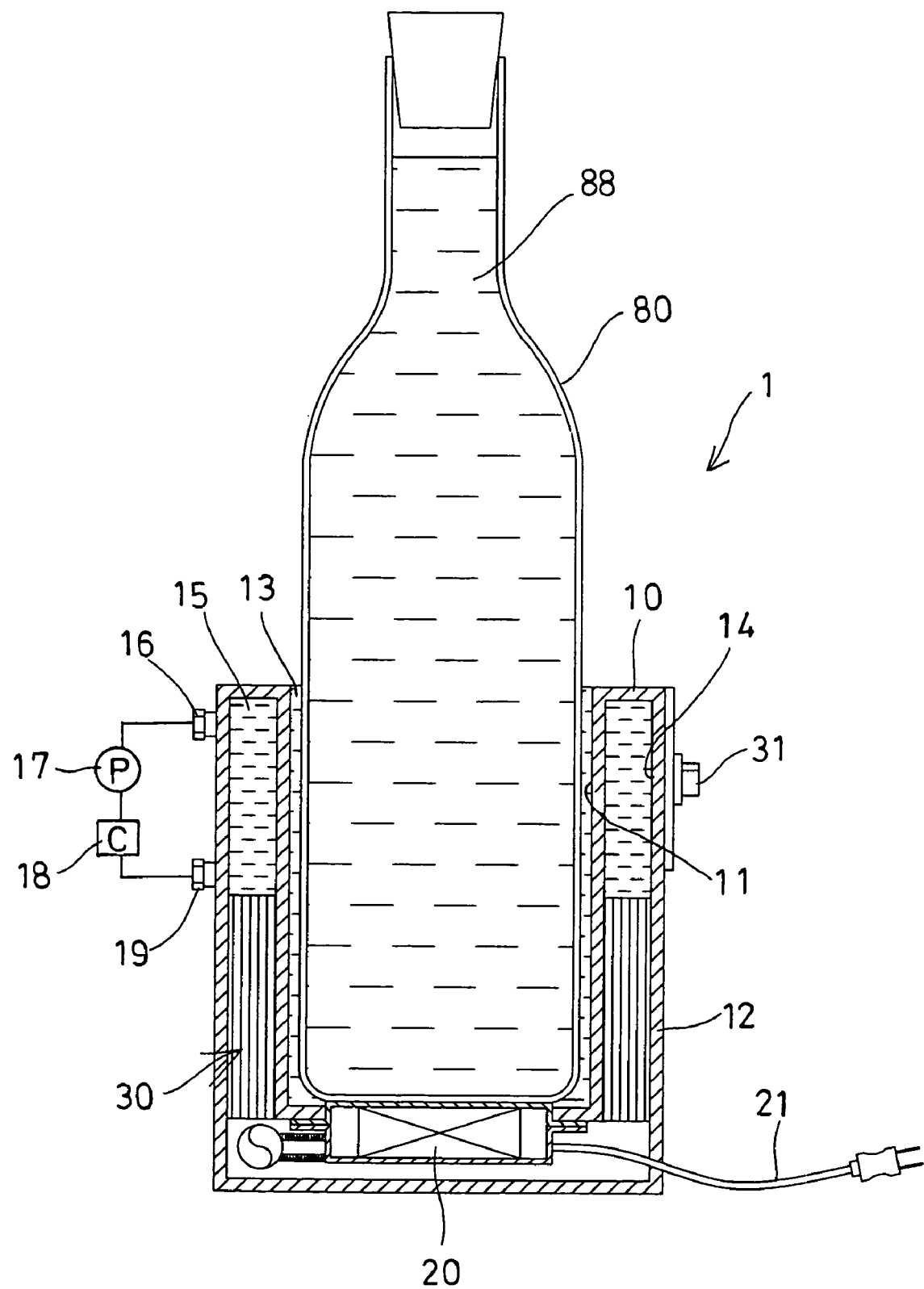
FIG. 2 is a cross sectional view of the aging device taken along lines 2-2 of FIG. 1.
Figure 3:
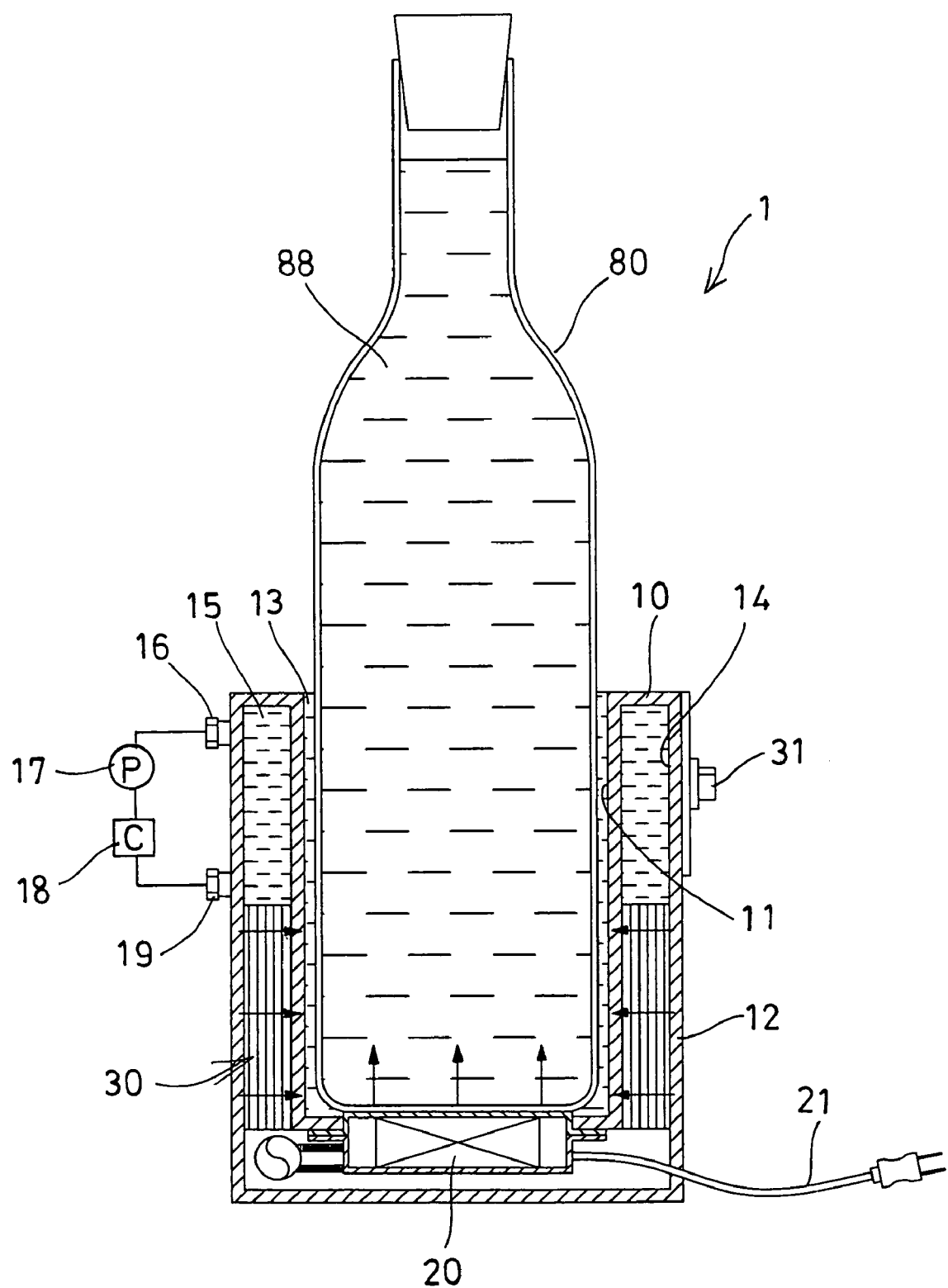
FIG. 3 is a cross sectional view similar to FIG. 2, illustrating the operation of the aging device.

Referring to the drawings, and initially to FIGS. 1 and 2, an aging device 1 in accordance with the present invention comprises an aging container 10 including a chamber 11 formed therein and defined by a peripheral wall 12, for receiving a vibrating agent or medium 13, such as water 13 therein, and for receiving a bottle 80 therein, in which the bottle 80 is provided for receiving a liquid fermented product 88 therein, such as liquor, wine, alcohol or other liquid products or the like, or the bottle 80 may be selected from various bottled liquor or wine beverages. The vibrating agent or medium 13 is thus disposed or arranged between the bottle 80 and the peripheral wall 12 of the aging container 10.

An ultrasonic vibration unit or device 20 is disposed in the aging container 10, such as disposed in the bottom portion of the aging container 10, for applying a frequency to vibrate the liquid fermented product 88 received in the bottle 80 in order to oxidize the liquid fermented product 88. The frequency may be ranged from 20 to 160 kHz, and preferably ranged from 20 to 80 kHz, and the frequency may be applied to vibrate the liquid fermented product 88 indirectly via the vibrating medium 13, or directly without the vibrating medium 13. The ultrasonic vibration device 20 may be coupled to various electric power source via one or more electric wires or cables 21.

The aging container 10 may further include a heater 30 disposed therein for heating the liquid fermented product 88 received in the bottle 80, preferably indirectly via the vibrating medium 13. For example, the aging container 10 may include an inner peripheral space 14 formed in the peripheral wall 12 for receiving the heater 30, and/or for receiving a heat exchanging medium 15 therein, such as water 15, and for allowing the liquid fermented product 88 to be further heated or aged by the heater 30 indirectly via the vibrating medium 13 and/or the heat exchanging medium 15.

The aging container 10 may further include an outlet port 16 formed therein and communicating with the inner peripheral space 14 of the peripheral wall 12 or of the aging container 10 for allowing the heat exchanging medium 15 to flow out of the inner peripheral space 14 of the aging container 10. A pump 17 may be coupled to the outlet port 16 for pumping or circulating the heat exchanging medium 15 to such as a condenser 18 for heat exchanging purposes, such as for reducing the temperature of the heat exchanging medium 15, and the condenser 18 is then coupled to an inlet port 19 of the aging container 10 for supplying the heat exchanged heat exchanging medium 15 back to the aging container 10 again.

The inlet port 19 is also communicating with the inner peripheral space 14 of the peripheral wall 12 or of the aging container 10 for allowing the heat exchanging medium 15 to recycle and to flow into the inner peripheral space 14 of the aging container 10 again, and for allowing the heat exchanging medium 15 that has been cooled or heat exchanged to cool or to heat exchange with the liquid fermented product 88 directly or indirectly via the vibrating medium 13, such that the bottled liquid fermented product 88 may be heated or vibrated or treated by either or both the heater 30 and the ultrasonic vibration device 20.

The aging container 10 may further include a temperature controller 31 attached to the outer peripheral portion of the container 10 and coupled to the heater 30 and the ultrasonic vibration device 20 for controlling or actuating or operating the heater 30 and the ultrasonic vibration device 20 to heat and/or vibrate the liquid fermented product 88 directly or indirectly via the vibrating medium 13, and the aging container 10 may further include one or more buttons 33 also attached to the outer peripheral portion of the container 10 for controlling or operating the heater 30 and the ultrasonic vibration device 20.

In operation, the container 10 includes a chamber 11 formed therein for easily and readily receiving a liquid fermented product 88 that has been packaged or bottled in the bottle 80, such that the bottles 80 of the liquid fermented product 88 available from super markets may also be easily and readily heated or vibrated or treated or aged by either or both the heater 30 and the ultrasonic vibration device 20 of the aging device 1 in accordance with the present invention.

Figure 4:
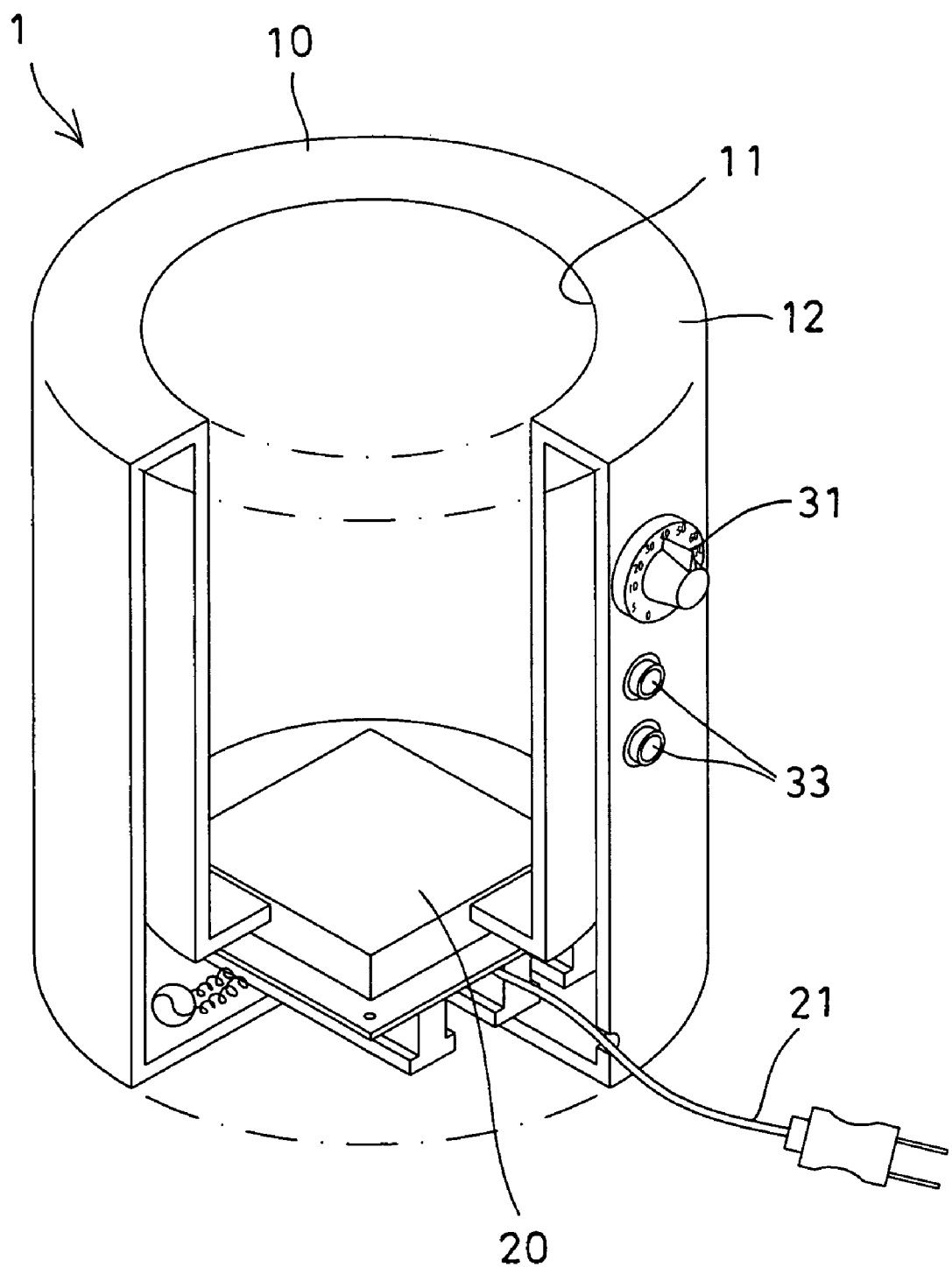
FIG. 4 is a perspective view similar to FIG. 1, illustrating the simplified arrangement of the aging device.
Figure 5:
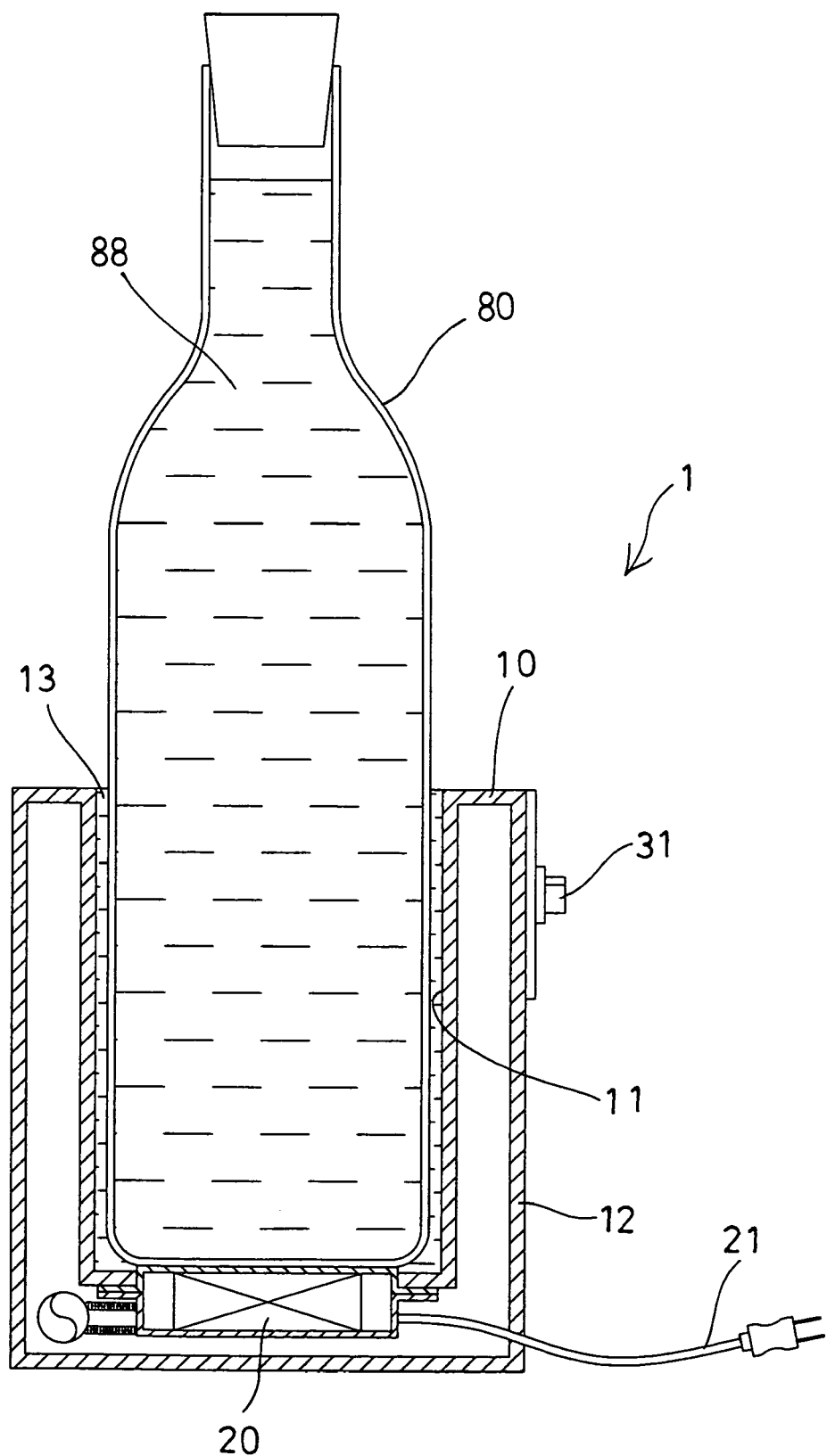
FIG. 5 is a cross sectional view illustrating the aging device as shown in FIG. 4.

Alternatively, as shown in FIGS. 4 and 5, without the heater 30 and the ultrasonic vibration device 20, the bottled liquid fermented products 88 may also be easily and readily heated or vibrated or aged by the ultrasonic vibration device 20 of the aging device 1 directly or indirectly via the vibrating medium 13.

Accordingly, the aging device in accordance with the present invention may be provided for aging the liquid fermented products that have been bottled or packaged, and includes a heating device for facilitating the aging of the liquid fermented products.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An aging device comprising:

an aging container including a chamber formed therein and defined by a peripheral wall, said aging container including an inner peripheral space formed in said peripheral wall, a heat exchanging medium received in said inner peripheral space of said peripheral wall of said aging container, said heat exchanging medium being water, said aging container including an inlet portion and an outlet port communicating with said inner peripheral space of said aging container for circulating said heat exchanging medium, a pump and a condenser coupled between said inlet portion and said outlet port for circulating said heat exchanging medium, a bottle received in said chamber of said aging container for receiving a liquid fermented product, a vibrating medium received in said chamber of said aging container and arranged between said bottle and said peripheral wall of said aging container, said vibrating medium being water, a heater disposed in said inner peripheral space of said aging container for heating said heat exchanging medium and said bottle, and an ultrasonic vibrating device disposed in a bottom portion of said aging container for applying an ultrasonic frequency to vibrate the liquid fermented product received in said bottle in order to oxidize the liquid fermented product, the frequency of said vibrating device being ranged from 20 to 160 kHz, and preferably ranged from 20 to 80 kHz.

* * * * *